J. M. SPOONER.
Broom Machine.
No. 718. Patented April 28, 1838.
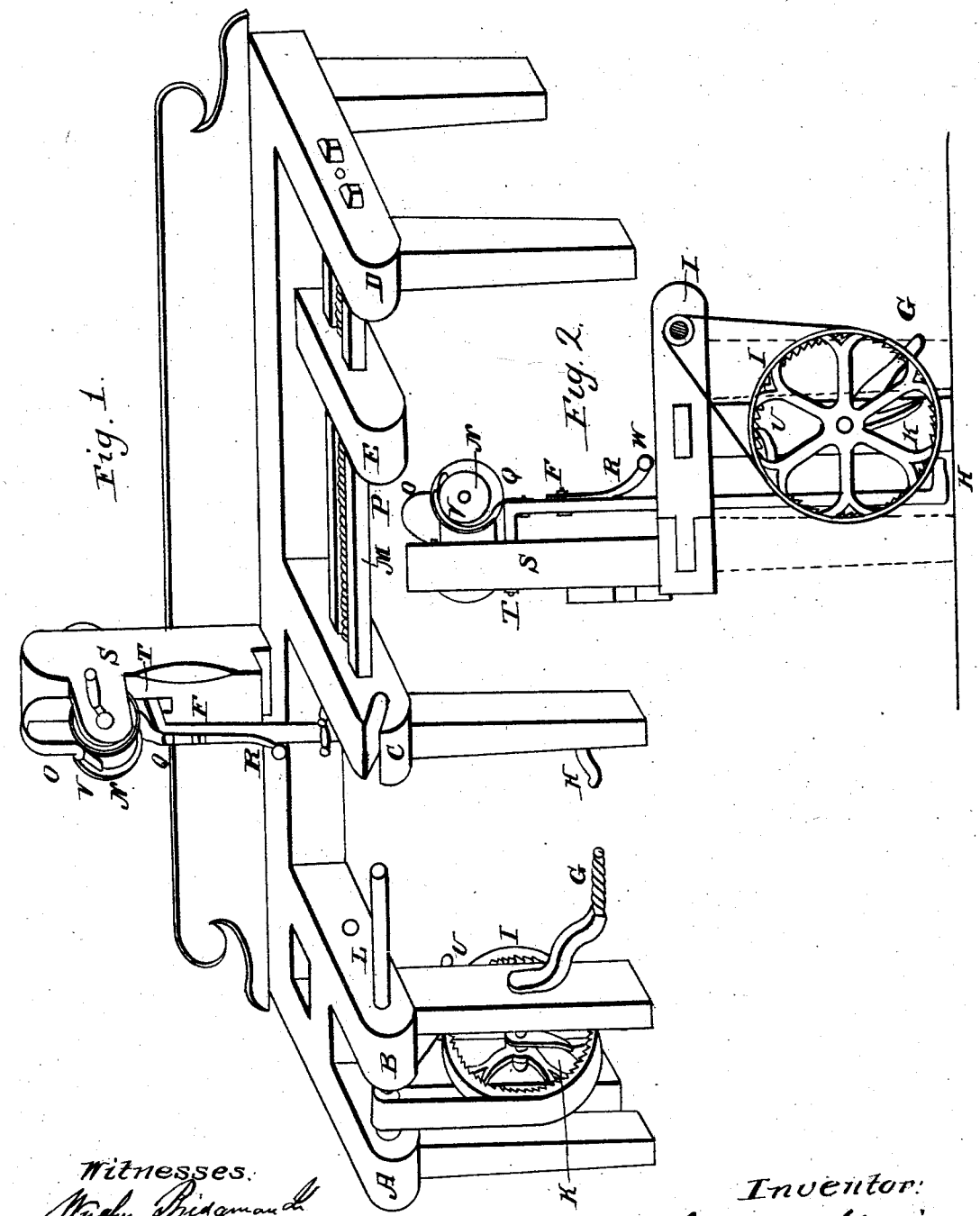

UNITED STATES PATENT OFFICE.

JOHN M. SPOONER, OF BELCHERTOWN, MASSACHUSETTS.

MACHINE FOR MAKING BROOMS, BROOM-BRUSHES, MOPS, &c.

Specification of Letters Patent No. 718, dated April 28, 1838.

*To all whom it may concern:*

Be it known that I, JOHN M. SPOONER, of Belchertown, in the county of Hampshire and Commonwealth of Massachusetts, machinist, have invented, made, and applied to use a new and useful Machine for the Manufacture of Brooms, Broom-Brushes, and Mops; and I do hereby declare that the following is a full and exact description and specification of the same.

The nature of my said invention consists in providing a method of holding the broom and furnishing and regulating the wire or twine by machinery in such a manner as to permit the manufacturer to sit upright during the operation and thereby to obviate the stooping position and other manipulations so injurious to health which have been heretofore practised.

To enable others skilled in the art to make and use my said invention I will proceed to describe its construction and operation having reference to the plan and explanations hereto annexed which are to be considered as a part of this my specification and description thereof.

A, B, C, D, E, represents the frame work for the support of the machine standing on legs and framed into a back beam upon which is set of a back board edgewise as represented in the plan. The platform of the frame may be covered with the exception of the space between B and O.

A, B, C, D, E, G, I, L, M, P, are constructed like a common turning lathe in the like parts thereof except that the headblock E, is moved forward and backward laterally by means of a crank on the end of the screw M, on the inner side of the block C, and also that the inner surface or rim of the large or balance wheel I, (revolving on its center like a coach wheel) has a rag wheel or cogs upon said inner surface into which plays the jointed catch or dog K. This catch or dog is affixed to the axle of the wheel I, and is moved by the crank G. The socket in the end of the spindle L is armed with spurs to hold the broom stiff and the corresponding socket at P, is smooth in which it turns. A hold U, slips into the cogs of the rag wheel at the top to prevent the wheel I, from turning back.

A little to the left of the standard and head block C, and in the back beam is affixed an upright shaft S, having an arm projecting toward the front. A lever passes horizontally through a mortise at T in the upright shaft and is fastened in the rear by a nut and screw the lever playing freely in the mortise in front of the shaft it is bent at right angles downward and at the bottom is again bent forward for a pedal as represented at F, and H. At the angle of the lever in front of the mortise a leathern strap V is fastened and passed backward and upward over the spool on which the wire or twine is wound. The spool is placed like a shieve in the block in the projecting arm of the shaft at N. In the rear of the spool is a semicircular spring O one end of which is fastened to the upright post or shaft and the other presses on the leather strap passing over the spool to hold the wire tight. On the lever F in front at a point about level with the platform is affixed a rod R bent to the segment of a circle and having upon it a movable slide and whir or pulley W for raising or depressing the wire as it is wound on the broom.

Mode of operation: Place the broom stuff in the sockets of the lathe at L, and P, and lay on your brush at the same time turning the stuff at your pleasure with your left foot on the crank G. Draw the wire from the spool N and pass it under the whir or pulley W sliding on the bent rod R holding the other end fast on the spool by means of the foot on the pedal H, and moving the slide and pulley W on the segment R as occasion may require the operator sitting on a stool in front of the lever.

What I claim as my invention and desire to secure by Letters Patent is as follows, to wit:

1. The machinery and method herein described for moving the lathe by means of the rag wheel jointed catch and crank as herein combined.

2. The lever F, with the strap V, spool N, spring O, bent rod R, slide and pulley W, as herein described for holding and managing the wire or twine as herein combined.

3. The particular combination of machinery herein described and specified for the manufacture of broom brushes and mops.

Witness my hand this twenty fourth day of January in the year of our Lord one thousand eight hundred and thirty eight.

JOHN M. SPOONER.

Witnesses:
ELMER BERNARD,
SAML. WELLS, Jr.